(12) United States Patent
Murota (10) Patent No.: US 8,672,141 B2
(45) Date of Patent: Mar. 18, 2014

(54) SOLID-LIQUID SEPARATING SYSTEM

(75) Inventor: Yoshiaki Murota, Kanagawa (JP)

(73) Assignee: Justec Corporation, Yokohama-shi, Kanagawa (JP)

( * ) Notice: Subject to any disclaimer, the term of this patent is extended or adjusted under 35 U.S.C. 154(b) by 563 days.

(21) Appl. No.: 12/936,138

(22) PCT Filed: Mar. 30, 2009

(86) PCT No.: PCT/JP2009/057018
§ 371 (c)(1),
(2), (4) Date: Dec. 6, 2010

(87) PCT Pub. No.: WO2009/123334
PCT Pub. Date: Oct. 8, 2009

(65) Prior Publication Data
US 2011/0114550 A1 May 19, 2011

(30) Foreign Application Priority Data

Apr. 4, 2008 (JP) ................................ 2008-098624

(51) Int. Cl.
*C02F 11/12* (2006.01)
*B01D 33/00* (2006.01)
(52) U.S. Cl.
USPC ........................................................ 210/384
(58) Field of Classification Search
USPC ......................................... 210/359, 384, 388
See application file for complete search history.

(56) References Cited

U.S. PATENT DOCUMENTS 4,207,189 A * 6/1980 Geuenich ...................... 210/227
5,445,733 A * 8/1995 Van Egdon et al. ........... 210/229

FOREIGN PATENT DOCUMENTS

| JP | 6-155090 A | 6/1994 |
| JP | 2004-888 A | 1/2004 |
| JP | 2004-298936 A * | 10/2004 |
| JP | 3894366 B2 | 3/2007 |
| JP | 3947212 B1 | 7/2007 |
| JP | 2008-12522 A | 1/2008 |

* cited by examiner

Primary Examiner — Fred Prince
(74) Attorney, Agent, or Firm — Dickstein Shapiro LLP (57) ABSTRACT

A solid-liquid separating system of a parallel plate conveying type can efficiently dehydrate sludge at an inlet and effectively dehydrate it at an outlet, and assures good solid-liquid separating performance. A filter is constituted by a first plate group and a second plate group which perform the parallel motion and displacement left and right, and up and down on the basis of the circular motion. The first plate group includes a plurality of plates A arranged with predetermined spaces. The second plate group includes a plurality of plates B which are as thick as the plates A, and plates C which are thicker than the plates B. The plates B and C are separated. A press unit (not shown) presses sludge at an outlet, where gaps between plates are narrowed. Even when the sludge is dehydrated by applying pressure, few solids will flow out.

8 Claims, 11 Drawing Sheets

SOLID-LIQUID SEPARATING SYSTEM

FIELD OF THE INVENTION

This invention relates to a solid-liquid separating system which is applicable to separating solids and liquids from in sludge (such as livestock excreta, oil sludge generated by drainage treatment in food factories, surplus sludge resulting from sewage treatment, sludge caused by metal processing, plating, construction operation, meat processing, lunch making, and so on).

BACKGROUND OF THE INVENTION

The foregoing sludge usually contains a lot of water (approximately 99%), so that it is very difficult to compost it when it is raw. The sludge is banked up, is dehydrated until its moisture content becomes approximately 80%, and is changed to dehydrated pellets.

An existing solid-liquid separating system includes a cylindrical filter of a perforated metal and screws provided in the filter, and is generally called a screw press type dehydrator.

Sludge to be treated is put into the filter, is axially conveyed therein, and is discharged via holes of the perforated metal. In short, the sludge is extensively dehydrated as it being conveyed to a downstream side of the filter. Further, the filter is constructed to scrape the dehydrated sludge off from its inner surface, thereby getting ready to receive new sludge.

In the screw press type dehydrator, holes of the perforated metal tend to clog, and have to be cleaned by applying high-pressure water, which is troublesome and takes a high running cost.

It is very difficult to effectively use the whole circumferential area of the cylindrical filter. Immediately after the sludge is applied to the filter, approximately only a half of a circumferential area of the filter is usable.

In order to overcome the foregoing problems, parallel plate conveying type separating systems have been proposed in Japanese Patent No. 3,894,366 and Japanese Patent Laid-Open Publication Hei 6-155090.

With one of the parallel plate conveying type separating systems, a plurality of strip-shaped plates are piled and arranged in a direction which is orthogonal to a conveying direction of the sludge. A pair of combined plate groups interlock with each other. One of such combined plate groups performs a parallel circular movement, i.e. is displaced side to side and up and down, and conveys the sludge in a longitudinal direction in response to the displacement of the upper surface of the plates.

Each pair of upper and lower plate groups performs the parallel movement while their upper surfaces are displaced in the longitudinal direction, which enables the sludge to be gradually moved and conveyed on the plates.

Usually, gaps between each pair of interlocked plate groups are equally sized between an inlet and an outlet for the sludge. Treated liquid is discharged via the gaps.

With the foregoing parallel plate type separating system, the sludge is spread over substantially parallel upper flat surface of the plates. This is effective in improving a usage rate of the filter surface. Further, the plates rub with each other during the parallel movement, which can prevent clogging of the filter, and is substantially free from maintenance work such as cleaning.

SUMMARY OF THE INVENTION

Problems to be Solved by the Invention

In the foregoing solid-liquid separating system, all of gaps between plates are substantially equally sized in the longitudinal direction. Solids and liquids are difficult to be efficiently separated.

In order to improve a dehydrating ratio, usually, an outlet side is raised, and high pressure is applied to the sludge by gravity, or weights or the like are provided on plates near the outlet in order to press the sludge.

When the gaps between plates are equally sized at the outlet side as well as the inlet side, the gaps at the outlet are subject to a pressured condition different from the pressured condition which is appropriate at the inlet side. This will lead to a problem that solids are frequently discharged together with liquids at the outlet side, and filtered liquids may cause high load when returned to a raw water tank.

Especially, when a press unit is provided, more solids tend to flow out. In order to overcome this problem, if gaps between plates at the outlet side are set as a reference value, the dehydrating rate at the inlet side tends to be extremely lowered, and processing efficiency will be reduced.

The present invention has been contemplated in order to overcome problems of the prior art, and is intended to provide a solid-liquid separating system which can efficiently dehydrate liquids at the inlet and the outlet, to prevent solids from flowing out at the outlet, and to improve treatment efficiency.

Means to Solve Problems

According to the invention, there is provided a solid-liquid separating system which includes: a first plate group including a plurality of plates which are piled with predetermined spaces in a direction orthogonal to a longitudinal direction, extend between an inlet and an outlet for sludge and have a single-piece structure; and a second plate group including a plurality of plates which are arranged to be engaged with the plates of the first plate group and has a single-piece structure. The sludge is conveyed from the inlet to the outlet as the upper surfaces of the plates of the first and second plate group are alternately moved up and down in response to the circular motion of the first plate group and/or the second plate group. Gaps between the piled plates are narrower at the outlet than those at the inlet.

Advantages of the Invention

In accordance with the invention, solids can be prevented from leaking via the gaps between plates when high pressure is applied at the outlet. This is effective in improving the pressurization at the dehydrating section, in lowering a moisture content of dehydrated cakes, and raising the treatment efficiency.

| Reference Numerals | |
|---|---|
| 14 | filter |
| 18 | press unit |
| 21 | sludge pellet to be treated |
| 28 | first plate group |
| 30 | second plate group |
| 52 | partition |
| g1, g2 | gaps |
| B | first split plate |
| C | second split plate |

DETAILED DESCRIPTION OF THE INVENTION

The invention will be described with reference to embodiments shown in the drawings. Refer to FIG. 1(a) to FIG. 9 for a first embodiment. A solid-liquid separating system 1 is applied to dehydration of surplus sludge generated by an organic effluent treatment facility in a food industry or the like. In the drawings, thicknesses of components will be sometimes omitted.

Figure 1A:
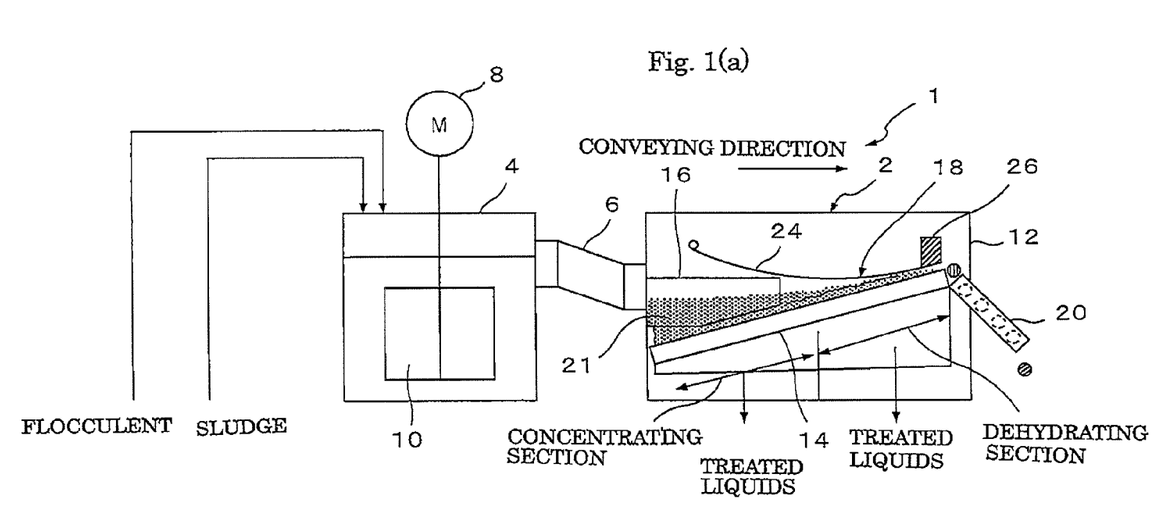
FIG. 1(a) is a longitudinal section of a solid-liquid separating system according to a first embodiment of the invention.
Figure 1B:
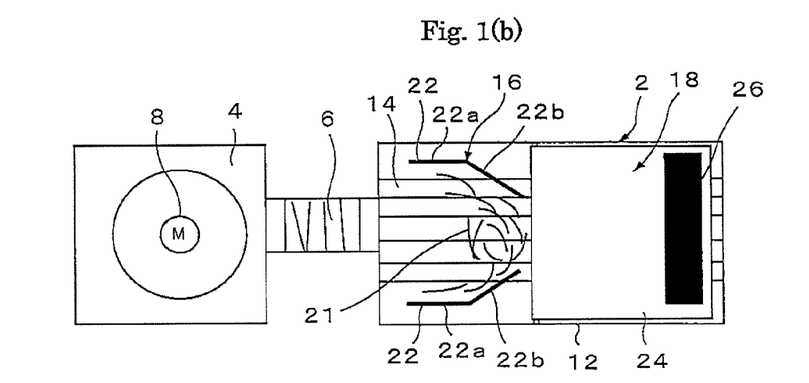
FIG. 1(b) is a schematic top plan view of the solid-liquid separating system.

Referring to FIG. 1(a) and FIG. 1(b), the solid-liquid separating system 1 includes a solid-liquid separator 2, a blending tank 4 which houses sludge to be treated and in which a flocculent is filled in order to bank up the sludge, and a pipe 6 via which the sludge is made to flow to the solid-liquid separator 2 from the blending tank 4. The sludge in the blending tank 4 is agitated by an agitator 10.

The solid-liquid separator 2 includes the following: a housing 12; a filter 14 positioned in the housing 12 and a filtering surface which is raised toward an outlet at a downstream of the solid-liquid separating system 1; a press unit 18 applying pressure to the sludge at the outlet; and a chute 20 via which dehydrated solids (dehydrated cakes) are discharged to an exterior.

The flocculent is high molecular and is applied into the blending tank 4, thereby making sludge pellets 21 (each sludge pellet 21 having a diameter of approximately 5 mm to 10 mm). When the sludge pellets 21 become sufficiently large, they are put into the inlet of the filter 14 in an overflow state.

The filter 14 is divided into a concentrating section which concentrates and dehydrates the sludge pellets mainly using gravity, and a dehydrating section which forcibly presses and dehydrates the sludge pellets using the press unit 18.

A concentrating guide 16 includes a pair of guide plates 22 which are spaced in a direction orthogonal to a conveying direction of the filter 14. Each guide plate 22 is bended, and has a parallel part 22a extending in the conveying direction, and a skew part 22b inclined toward the center of the filter surface. An inlet end of the parallel part 22a is fixed onto a side plate of a first plate unit 72 to be described later.

The sludge pellets 21 are put into the inlet of the filter 14, are collected toward the center of the filter surface in the conveying direction by the concentrating guide 16, and are concentrated by the concentrating section using the gravity.

The press unit 18 includes a press plate 24 whose one end is rotatably supported at an upstream side in the conveying direction and which is gradually curved, and a weight 26 fixedly attached on an upper surface of the pressure plate 24 at a downstream side in the conveying direction.

A clearance between the surface of the filter 14 and the press plate 24 is gradually narrowed in the shape of a wedge, so that more pressure is applied to the sludge pellets 21 which are being conveyed.

The sludge pellets 21 collected at the center filter surface by the concentrating guide 16 are outspread toward sides of the filter surface by the press unit 18. This enables uniform pressure to be applied onto the sludge pellets 21. Cooperation of the concentrating guide 16 and the press unit 18 improves the dehydration efficiency.

A length of the concentrating guide 16 depends upon the concentration of the sludge pellets 21. For instance, the concentrating guide 16 can be configured to have an appropriate length as shown in FIG. 2.

Figure 2:
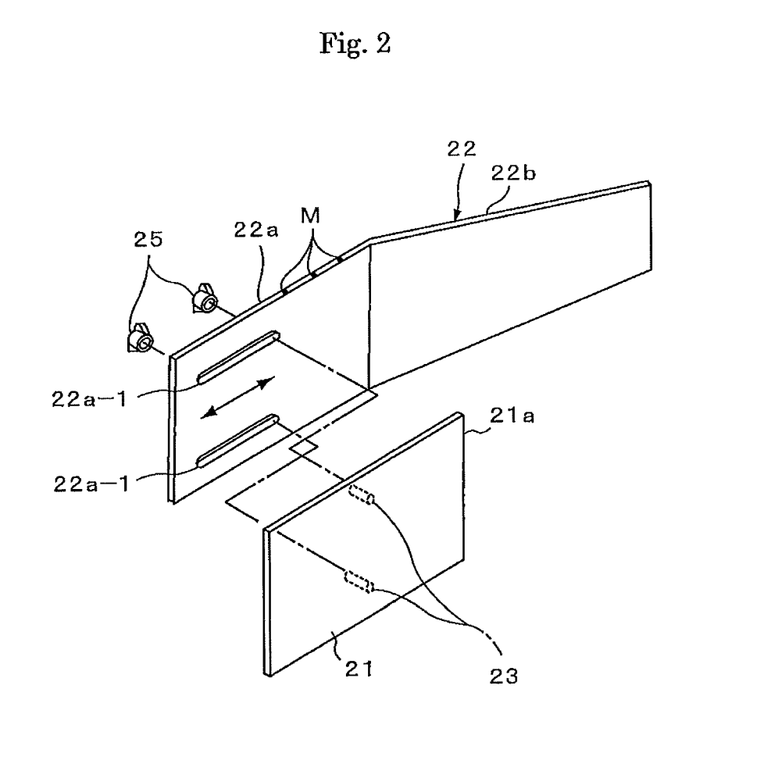
FIG. 2 is an exploded perspective view of an adjustable concentrating guide.

Referring to FIG. 2, the concentrating guide 16 may include an additional stationary plate 21 which is attached to side plates of the first plate unit 72. One or more long holes 22a-1 are made on each parallel part 22a of each guide plate 22. Screws 23 integral with the stationary plate 21 are fitted into the long holes 22a-1, and are engaged with nuts 25.

Calibration marks M or the like are made on the parallel section 22a. An edge 21a of the stationary plate 21 can be easily adjusted based on the calibration marks M depending upon kinds of the sludge pellets 21.

Pressure applied by the press unit 18 depends upon material properties of the sludge pellets 21. Although not shown, the weight 26 is adjustable depending upon the properties of the sludge pellets 21. The weight 26 may be formed by a plurality of split components, or may be made of a liquid tank in which an amount of a liquid is adjustable.

Figure 3:
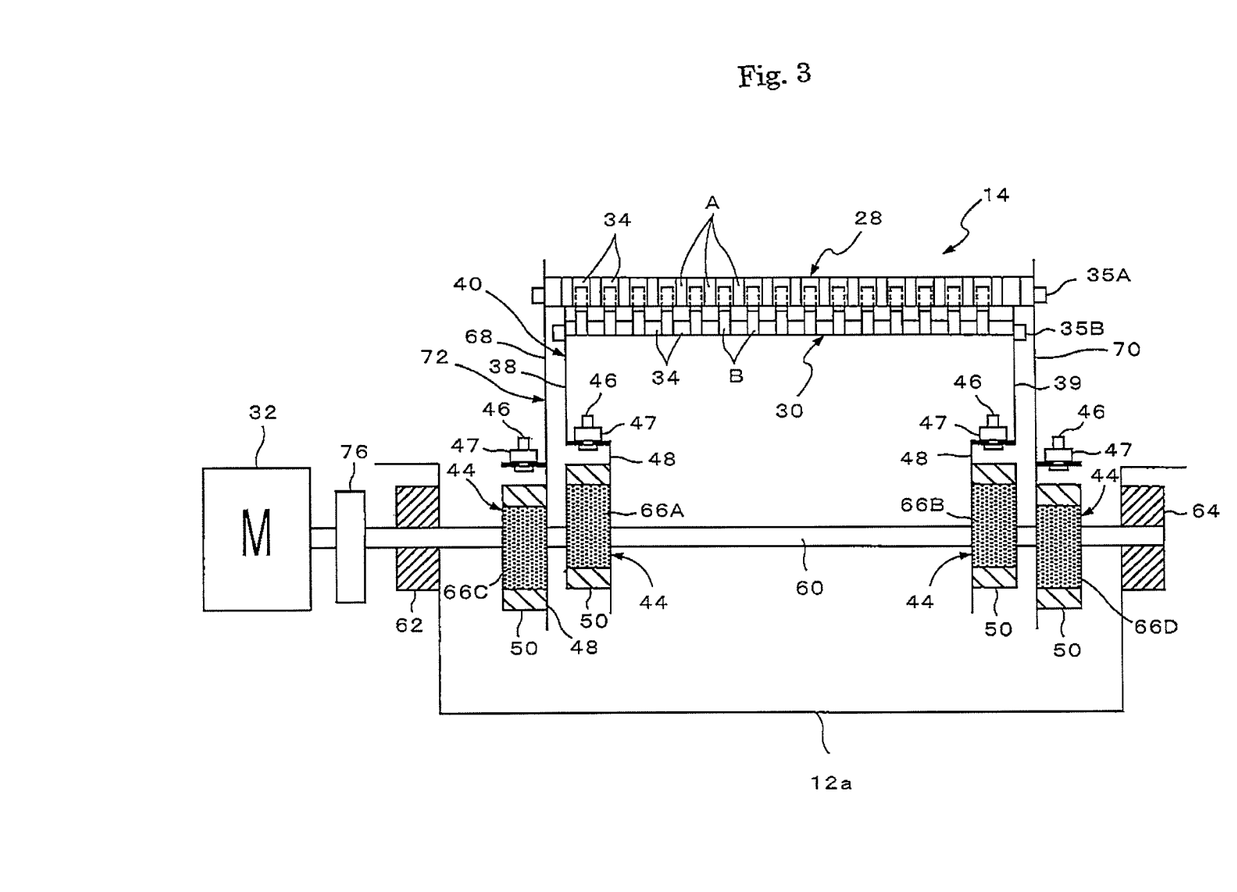
FIG. 3 is a sectional view of the solid-liquid separating system, taken in a direction orthogonal to a direction in which treated sludge is conveyed.

As shown in FIG. 3, the filter 14 is constituted by first and second plate groups 28 and 30, which are engaged with each other in the shape of teeth. The first and second plate groups 28 and 30 are designed to be movable in four directions (up and down, and right and left), i.e. perform the parallel movement to be described later.

Figure 4A:
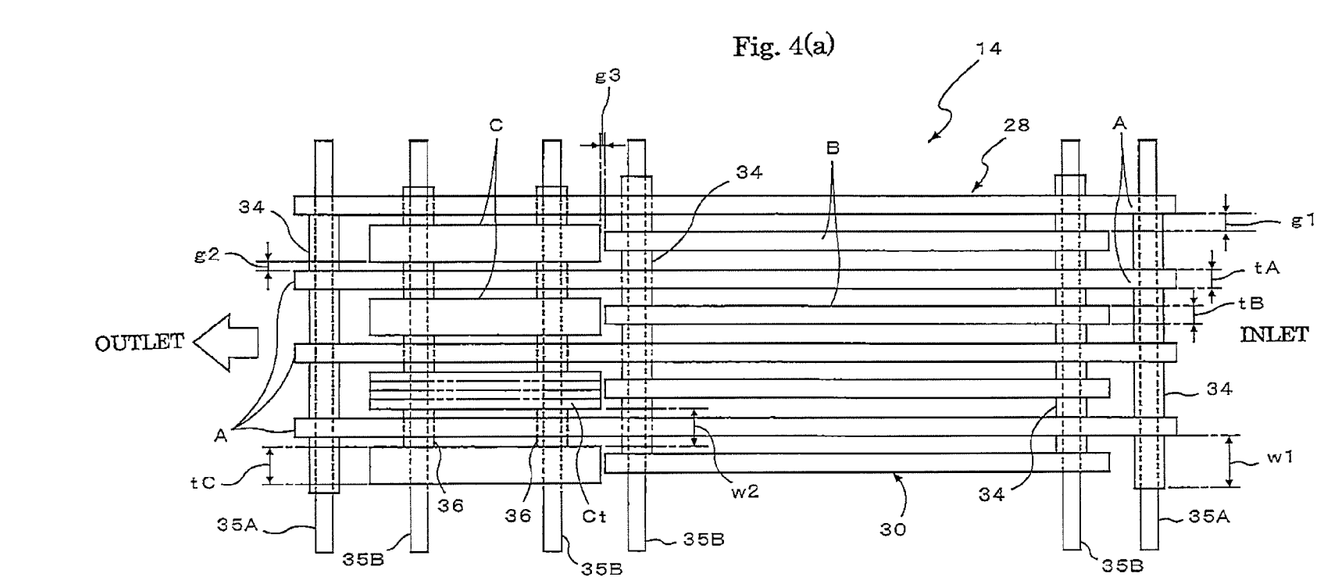
FIG. 4(a) shows arrangements of plates in first and second plate groups.
Figure 4B:
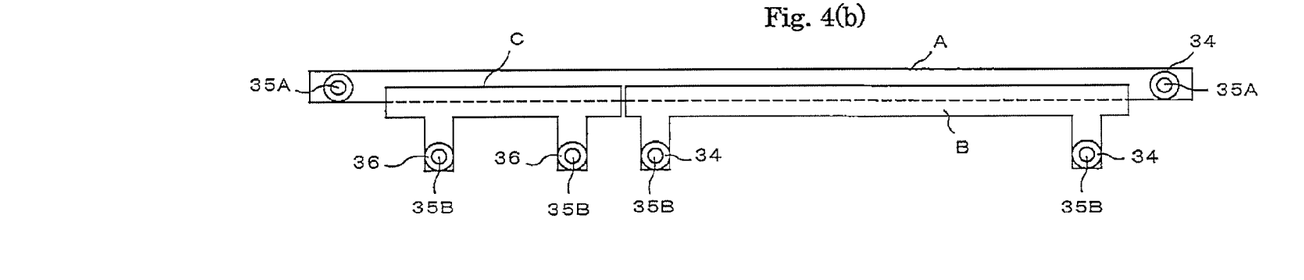
FIG. 4(b) is a side elevation of the plates.

Referring to FIG. 4(a) and FIG. 4(b). the first plate group 28 includes a plurality of strip-shaped plates A, which are piled at constant intervals via spacers 34, and are joined as one unit using long bolts 35A at the inlet and outlet sides.

The second plate group 30 includes a plurality of strip-shaped plates B as first split plates which are positioned at the concentrating section, and a plurality of strip-shaped plates C as second split plates which are positioned at the dehydrating section. This means that the filter 14 is provided with three kinds of plates.

The plates B are piled at constant intervals with spacers 34 placed between them, similarly to the plates A, and are joined as one unit using long bolts 35B at the inlet and outlet.

The plates C are piled at constant intervals with spacers 36 placed between them, and are joined as one unit using long bolts 35B at the inlet and outlet.

Dimensions of the plates A, B and C are as follows:

| | |
|---|---|
| Thickness tA of each plate A: | 1.5 mm |
| Thickness tB of each plate B: | 1.5 mm |
| Thickness tC of each plate C: | 2.0 mm |
| Length w1 of each spacer 34: | 2.5 mm |
| Length w2 of each spacer 36: | 2.0 mm |
| Gap g1 between plates A and B: | 0.5 mm |
| Gap g2 between plates A and C: | 0.25 mm |

By increasing a thickness of each plate C, the gap g2 between plates at the dehydrating section can be reduced to a half of the gap g1 of the concentrating section using the gravity.

The gap g3 between the plates B and C is preferably as small as possible in order to smoothly convey the sludge in the longitudinal direction.

Figure 5:
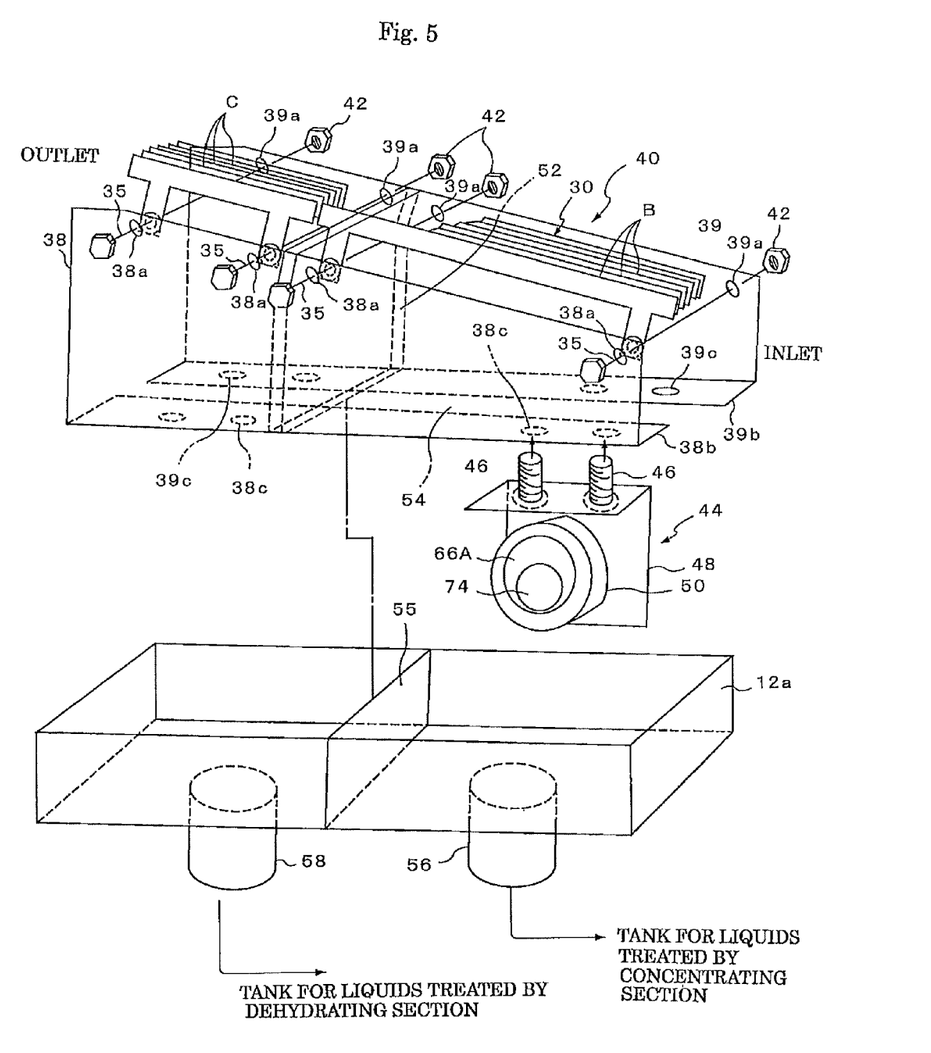
FIG. 5 is a schematic perspective view of a second plate unit including a second plate group.

Referring to FIG. 5, the plates B and C are positioned by supporting the long bolts 35B between a pair of L-shaped side plates 38 and 39, thereby constituting a second plate unit 40. Reference numerals 38a and 39a denote bolt holes, and 42 denotes a nut. Inlets and outlets of the second plate unit 40 are blocked by side plates (not shown).

An eccentric cam holder 44 is fixedly attached to an inlet and an outlet of a bottom 38 of the side plate 38, and includes an L-shaped bracket 48 (fixed to the bottom 38a by a bolt 46 and a nut 47 as shown in FIG. 3), and a cam receptacle 50 fixedly attached to the L-shaped bracket 48.

The eccentric cam holder 44 is also fixedly attached at the outlet of the side plate 38. The same holds true to the side plate 39. In FIG. 5, reference numerals 38c and 39c denote bolt holes.

A partition 52 is disposed at a boundary between the concentrating section and the dehydrating section in the second plate unit 40, so that liquids treated by the concentrating section and those treated by the dehydrating section can be separately recovered.

Treated liquids drop into a space defined by the bottoms 38b and 39b of the side plates 38 and 39.

A bottom 12a of the housing 12 is divided into two parts by a partition 55 similarly to the parts divided by the partition 52, which enables the treated liquids to be conveyed via outlets 56 and 58.

A driveshaft 60 connected to a motor 32 as shown in FIG. 3 is rotatably supported by roller bearings 62 and 64 fixedly attached to the side plate of the housing 12. Four eccentric cams 66A, 66B, 66C and 66D are fixedly attached on the driveshaft 60. The two eccentric cams 66A and 66B are housed in the cam receptacle 50 of the eccentric cam holder 44 of the second plate unit 40, and are rotatable therein.

The first plate group 28 is positioned by the long bolts 35A which are supported between a pair of L-shaped side plates 68 and 70, and constitutes the first plate unit 72. The side plates 68 and 70 are present outside the side plates 38 and 39.

The pressure plate 24 of the press unit 18 is rotatably supported between the side plates 68 and 70. Similarly to the second plate unit 40, the inlet and outlet of the first plate unit 72 are covered by a side plate (not shown), and the parallel part 22a of the concentrating guide 16 is fixedly attached to a side plate near the outlet.

As in the second plate unit 40, another eccentric cam holder 44 is fixedly attached on a bottom of the side plates 68 and 70. The eccentric cams 66C and 66D are rotatably housed in a cam receptacle 50 of the eccentric cam holder 44.

Figure 6:
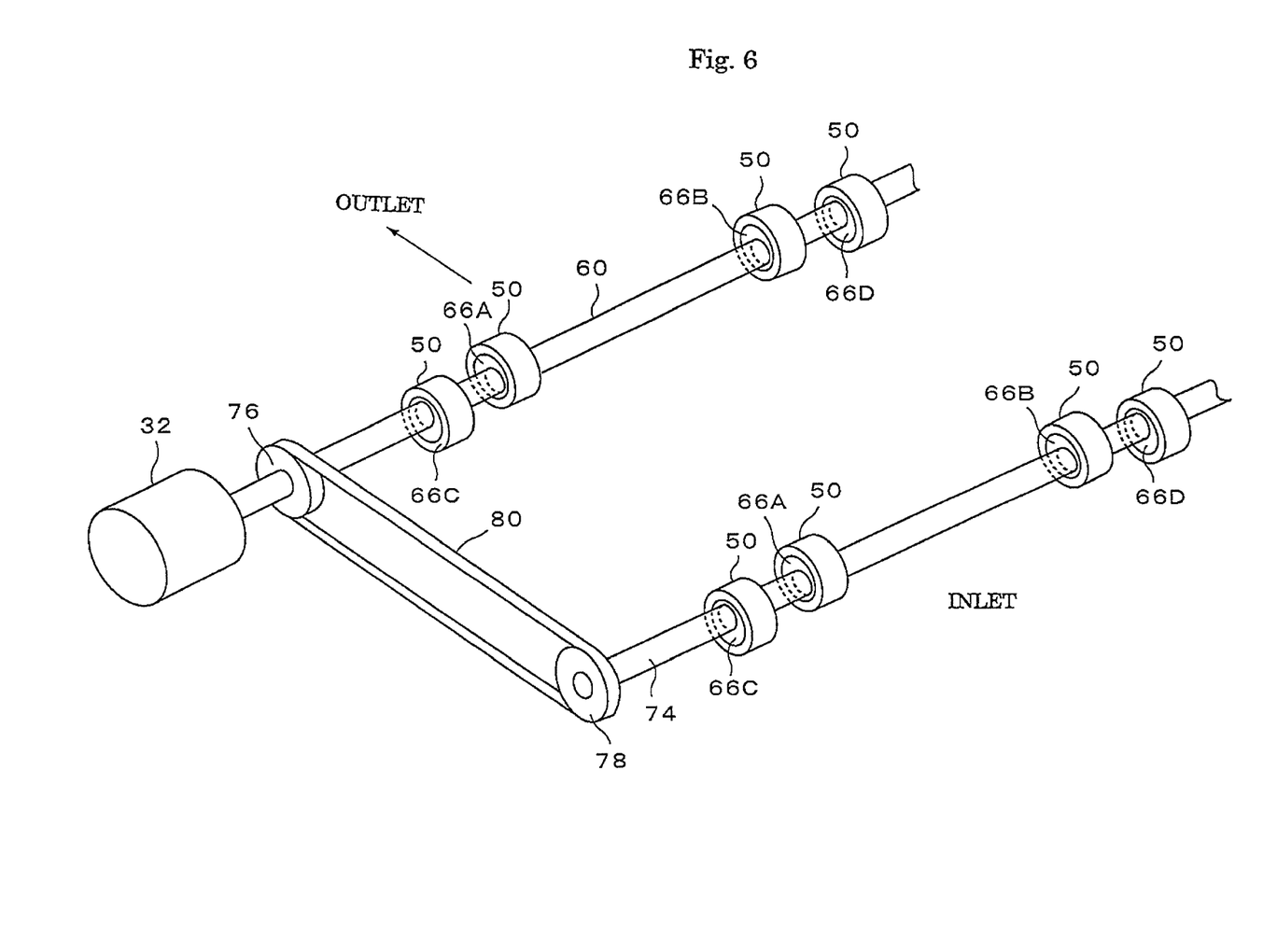
FIG. 6 is a perspective view of a mechanism for making parallel movement of a filter using eccentric cams.

Referring to FIG. 6, a driven shaft 74 is supported at the inlet of the housing 12 similarly to the driveshaft 60, and carries another set of four eccentric cams 66A, 66B, 66C and 66D which are fixedly attached thereon.

Chain wheels 76 and 78 are provided near the motor 32 of the driveshaft 60 and the driven shafts 74. A chain 80 extends around the chain wheels 76 and 78 in order to transmit drive power of the motor 32 to the driven shaft 74.

Figure 7A:
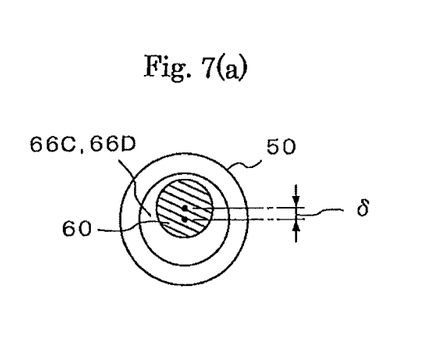
FIG. 7(a) shows an eccentric cam for the first and second plate units.
Figure 7B:
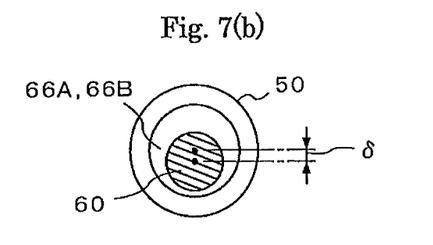
FIG. 7(b) shows the eccentric cam for the first and second plate units, the cam being displaced by 180° compared to FIG. 7(a).

Each of the cams 66 has eccentricity $\delta$ (5 mm in this case) as shown in FIG. 7(a) and FIG. 7(b). The eccentric cams 66C and 66D for the first plate unit 72 (having the plate A) and the eccentric cams 66A and 66B for the second plate unit 40 (having the plates B and C) are designed to have a phase difference of 180°.

In short, vertical displacements of the upper surfaces (upper edges) of the plates A, B and C are designed to be maximum. This phase difference is not always a prerequisite condition.

The first and second plate units 72 and 40 are supported via the eccentric cams 66A, 66B, 66C and 66D, and enable the first and second plate groups 28 and 30 (having the plates B and C, respectively) to perform the parallel movement with right to left, and up and down displacements of 180° phase difference.

Figure 8A:
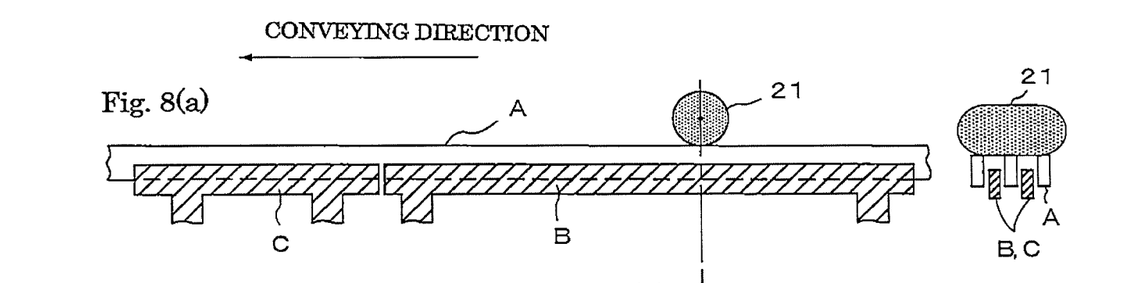
FIG. 8(a) schematically shows a principle for conveying sludge by parallel movement of plates, sludge pellets being placed on a filter surface.
Figure 8B:
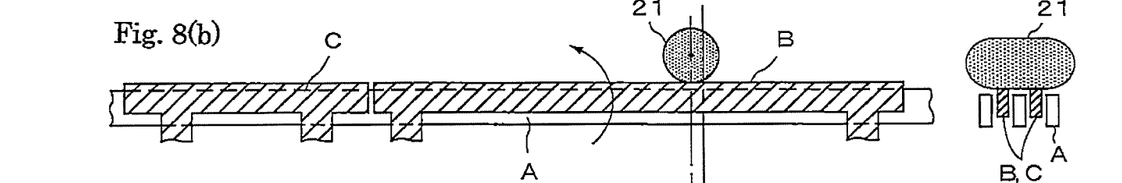
FIG. 8(b) is similar to FIG. 8(a), and shows a state in which the sludge pellets are raised by filter surfaces of plate groups B and C, and are being conveyed to an outlet.

FIG. 8(a) shows that the sludge pellets 21 are placed on the filter surface constituted by the upper surface of the plate A. In this state, the filter surface of the plate A is moved downward while the filter surfaces of the plates B and C are moved upward, so that the sludge pellets 21 are raised by the filter surfaces of the plates B and C, and are carried toward the outlet as shown in FIG. 8(b).

Figure 8C:
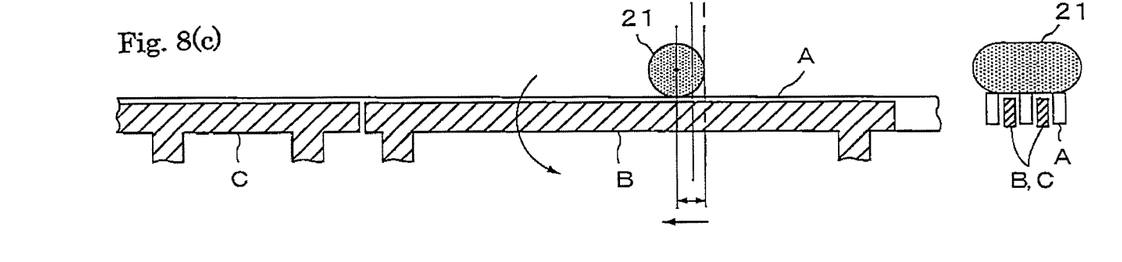
FIG. 8(c) is similar to FIG. 8(a), and shows a state in which the sludge pellets are raised by filter surfaces of B and C plate groups, and are being conveyed to the outlet.

Thereafter, the sludge pellets 21 on the filter surfaces of the plates B and C are transferred onto the filter surface of the plate A which has been moved upward, as shown in FIG. 8(c).

The sludge pellets 21 are gradually conveyed to the outlet in response to the right and left and up and down displacements of the filter surfaces.

The first plate group 28 and the second plate group 30 are mutually displaced up and down, so that the filter surface conveying the sludge pellets 21 functions as a new filter surface each time the eccentric cams 66 rotate.

Figure 9:
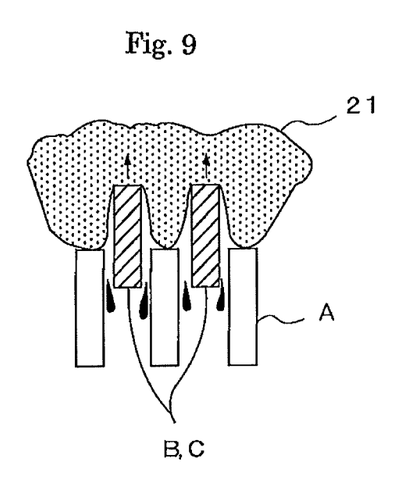
FIG. 9 schematically shows how the sludge pellets are being dehydrated in response to the vertical displacement of the plates.

Referring to FIG. 9, the plates move upward, and receive the sludge pellets 21, which are squeezed and dehydrated. Therefore, when a difference of elevation of the first and second plate groups 28 and 30 is a maximum, an amount of squeezed liquids is most.

On the contrary, when the difference of elevation of the plate groups 28 and 30 is a minimum, the concentrating section cannot sufficiently squeeze and dehydrate the sludge pellets 21, and simply dehydrates them only by the gravity.

The concentrating section where the plates B and A perform the parallel motion dehydrates the sludge pellets 21 mainly using the gravity, which represents that liquids simply drain off through hollow spaces.

Therefore, treated liquids contain few solids in this state.

The dehydrating section presses the sludge pellets 21 on the filter 14 using the press unit 18, which promotes the dehydration of liquids from the sludge pellets 21.

The press unit 18 is effective in dehydrating the sludge pellets 21 while they are being conveyed in a short distance. However, if the gaps between the plates are equally sized in the concentrating section, a large amount of solids as well as liquids may flow out.

Generally speaking, in a sewage plant, treated liquids from a dehydrator are often recirculated to a raw water tank. The treated water containing a lot of solids tends to apply unnecessary load to sewage facilities, which is not preferable.

Up to now, it is preferable to separately recover liquids treated by the concentrating section and containing few solids and liquids treated by the concentrating section and containing a lot of solids. It is very difficult to discharge the water treated by the dehydrating section directly to a water-purifier tank.

In the solid-liquid separator 2 of the invention, the gap g2 between the plates of the dehydrating section is 0.25 mm which is half the gap g1 (0.5 mm) between the plates of the concentrating section. It is possible to suppress flowing out of solids when the sludge is pressured.

In the dehydrating section, sludge pellets 21 are gradually downsized, and the gaps of the filter surfaces (i.e. the gap between the plates) are narrowed. This means that the sludge pellets 21 can be extensively dehydrated by pressure compared to when the dehydrating section has the gaps whose sizes are equal to those of the concentrating section The higher the pressure, more liquids are removed via the gap g2, so that dehydrated solids will drop via the chute 20.

With the existing parallel plate type conveying system, the gaps between plates are equally sized throughout the conveying direction. Even when the pressure is increased in the dehydrating section in order to more extensively dry dehydrated cakes, simply more solids leak via the gaps.

On the contrary, the solid-liquid separator 2 of the first embodiment can efficiently lower moisture content of dehydrated cakes while suppressing leakage of solids.

Referring to FIG. 5, the partition 52 is positioned at the border between the concentrating section and the dehydrating section in order to separately retrieve treated liquids from the foregoing sections. The treated liquids from the dehydrating section can be directly sent to the water-purifier tank similarly to the treated liquids from the concentrating section.

A structure for separately retrieving treated liquids from the concentrating section and the dehydrating section may be omitted depending upon kinds of sludge pellets 21 and dimensions of the gaps.

The gaps between the plates of the dehydrating section may be narrowed as follows. For instance, a single-piece plate C extending between the inlet and the outlet may be thickened at the outlet, or one of the plates C (shown in FIG. 4) may be made of a plurality of piled thin plates Ct, thereby thickening the plate C as shown by alternate long-and-two short dash lines.

The thick plate C having a plurality of piled thin plates via spacers can be easily made and assembled, and is less expensive. The second-mentioned plate C is extensively advantageous in view of a manufacturing cost compared with the first-mentioned thick plate C when they are made of the same material (e.g. stainless steel).

The single-piece plate C thickened at the outlet may be made of reinforced plastics which are less expensive.

Alternatively, a plurality of plates (each plate having a different thicknesses) may be assembled depending upon kinds (properties) of the sludge, thereby adjusting the gap g2. Such measures enable the solid-liquid separating system to cope with a variety of kinds of sludge.

In such a case, it is preferable to adjust the number of thin plates Ct for the foregoing purpose.

Figure 10:
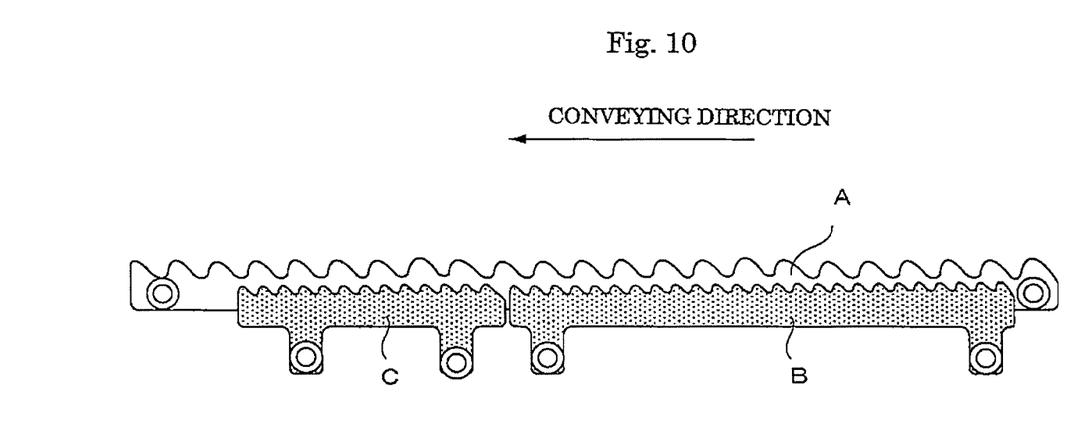
FIG. 10 is a side elevation showing a shape of a plate in a second embodiment.

FIG. 10 shows a solid-liquid separating system according to a second embodiment. Like or corresponding parts are denoted by like or corresponding reference numerals. Explanations will be made only on the structure or functions which are different from those of the foregoing embodiment. The same holds true to the other embodiments.

In the first embodiment, the upper surfaces of the plates A, B and C are flat. When they are uneven, the sludge can be efficiently moved to and pushed toward the outlet.

According to the second embodiment, the upper surfaces of the plates A, B and C are corrugated toward the outlet, which can efficiently convey the sludge to the outlet.

Sometimes the sludge is moved backward when it is in the dehydrating section. The corrugated surfaces of the plates cope with such backward movement of the sludge, and sufficiently convey the sludge.

Figure 11:
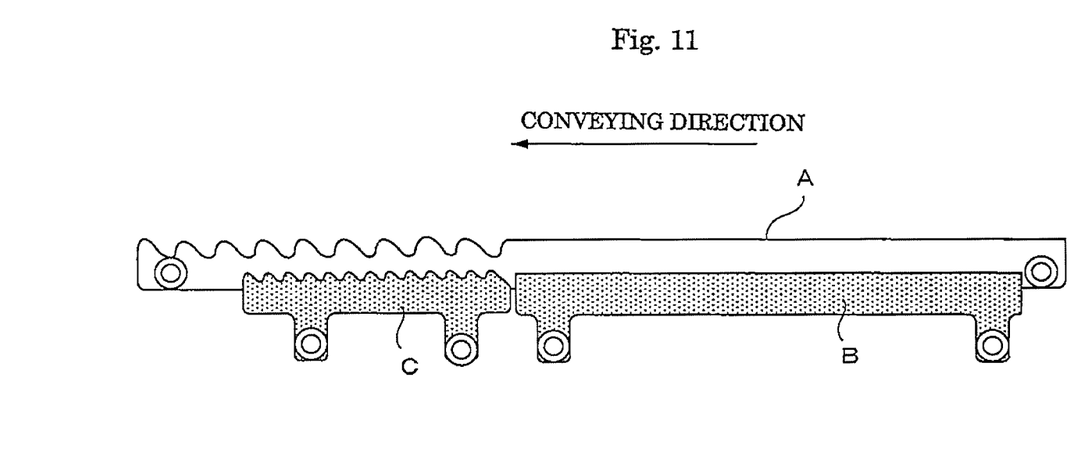
FIG. 11 is a side elevation showing a shape of a plate in a third embodiment.

A solid-liquid separating system of a third embodiment is shown in FIG. 11.

Usually, the upper surfaces of the plates are totally corrugated using laser beams, which inevitably takes a lot of cost.

In order to corrugate the plates at a reduced cost, the plates C and A are partially corrugated at positions corresponding to the dehydrating section. The plate B has the flat upper surface same as that of the plate B in the first embodiment.

The partial corrugation of the plates is effective in suppressing a manufacturing cost, assuring the sufficient pressure at the dehydrating section, and efficiently lowering moisture contents of the treated sludge.

Figure 12:
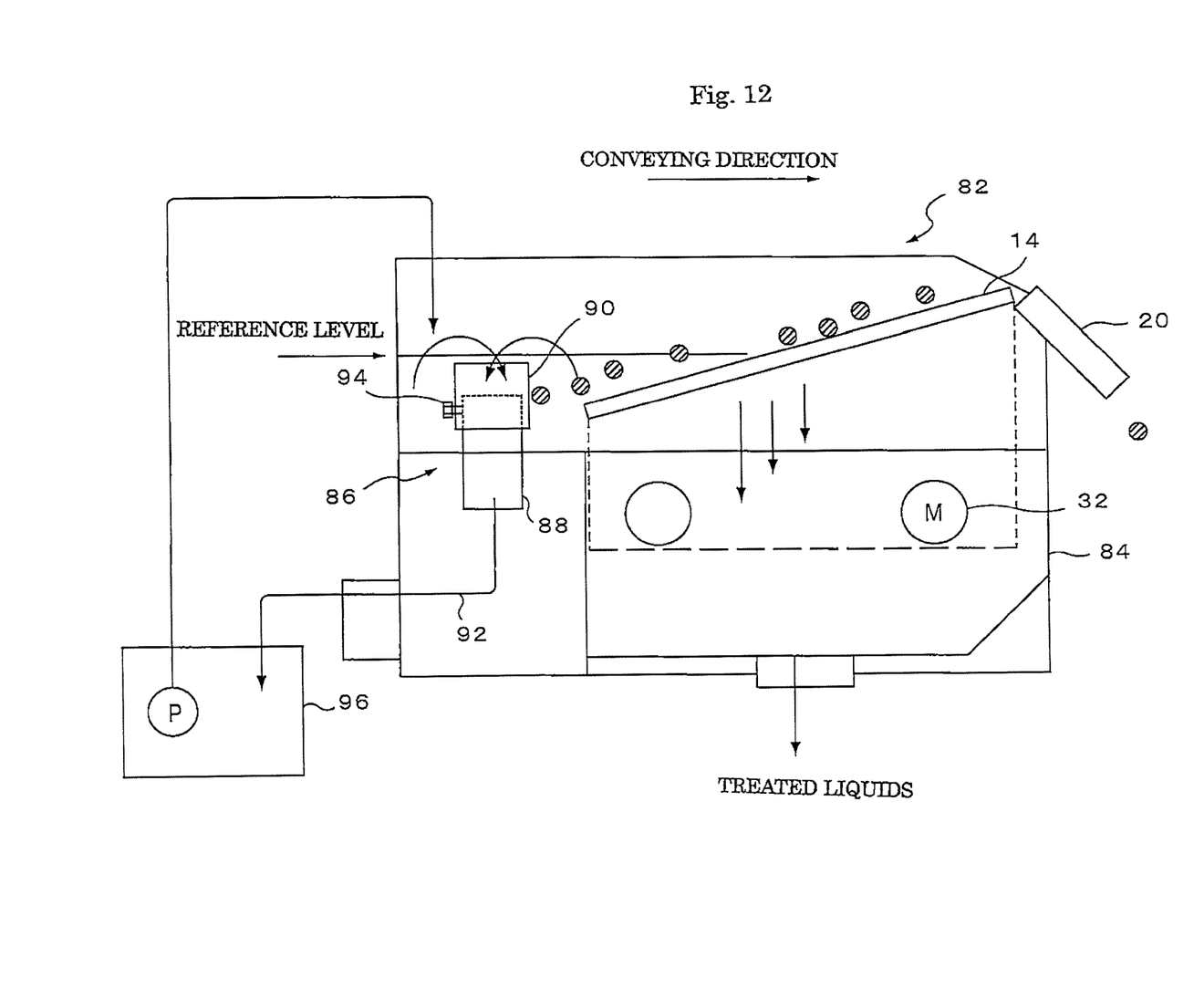
FIG. 12 is a schematic section view of a solid-liquid separating system according to a fourth embodiment.

A fourth embodiment of the invention is shown in FIG. 12.

A solid-liquid separator 82 physically screens large substances from sludge via openings of plates without using any high polymer flocculent. Although the press unit 18 is omitted in FIG. 12, the plates in the filter 14 are configured similarly to the plates shown in FIG. 11.

For instance, the solid-liquid separating system 82 screens large substances such as straw and bristles which are often mixed in livestock excrement, and garbage which is fractured by and discharged with water by disposers.

Sludge treated by the solid-liquid separating system 82 as the screen should be extensively dehydrated so that it is composted at a later stage. This can be accomplished by narrowing gaps between plates, and by corrugating upper surfaces of plates. This improves the screening function of the solid-liquid separator 82.

A sludge regulator 86 is provided on the filter 14 at the inlet of a housing 84 in order to control an amount of sludge to be treated, which enables a predetermined liquid level to be always maintained.

The sludge regulator 86 includes an exhaust duct 88 fixedly attached to the outlet of the housing 84, a level adjusting tube 90 slidably engaged with an upper part of the exhaust duct 88, a hose 92 connected to a bottom of the exhaust duct 88, and so on.

The level adjusting tube 92 is fixedly attached at an appropriate position of the exhaust duct 88 using a screw 94, and is used to adjust a sludge level.

An appropriate amount of sludge to be applied depends upon properties of the sludge and a liquid treating capacity of the filter 14. Otherwise, the filter 14 cannot function sufficiently, which may result in reduced treatment efficiency.

Sludge above the reference level (the upper surface of the level adjusting tube 90) will be taken into the exhaust pipe 88, be returned to a raw sludge tank 96 via the hose 92, and be re-supplied by a pump.

A predetermined amount of the sludge may be supplied from an exterior source. However, an amount of sludge to be treated by the filter 14 does not always match the supplied amount of the sludge. Therefore, the sludge regulator 86 is very advantageous and profitable in controlling the amount of the sludge to an optimum level with which the filter 14 can cope.

When the amount of the sludge is substantially controlled to the predetermined value, the sludge is undulated back and forth at the inlet of the filter 14 in response to the circular movement of the plates similarly at a water's edge of the sea, so that strip-shaped suspended solids (strip-shaped SS) tend to drift down on a border between a water level line and the filter 14 in a direction orthogonal to the conveying direction of the sludge.

The foregoing undulation effect allows the formation of minute filter surfaces by the gaps between the plates extending in the conveying direction and the strip-shaped SS, which promotes the filtering function. The undulation effect can be also accomplished in the foregoing embodiments in which the filter 14 is inclined.

In the fourth embodiment, the solid-liquid separating system includes the sludge regulator 86, and functions as the screen. The sludge regulator 86 may be used in each of the foregoing embodiments.

Further, the sludge regulator 86 may be integral with the filter 14 which performs the circular movement, as disclosed in Japanese Patent No. 3894366.

INDUSTRIAL APPLICABILITY

The invention has been described with respect to the solid-liquid separating systems. The structure of the filter 14 in which the gaps between the plates are narrowed at the outlet may be also applicable to a classification apparatus for paints and pigments.

In such a case, the press unit 18 is dispensable, and the plate groups may be flat. When separate trays are provided, treated liquids may be classified while they are being conveyed. In short, the treated liquids are not required to be classified in two stages.

What is claimed is:

1. A solid-liquid separating system comprising:
a first plate group including a plurality of plates which are piled with predetermined spaces in a direction orthogonal to a longitudinal direction, and extend between an inlet and an outlet for sludge and have a single-piece structure; and
a second plate group including a plurality of plates which are engaged with the plates of the first plate group and have a single-piece structure,
wherein the first and second plate groups constitute a filter, and wherein a press unit presses the sludge toward upper surfaces of the plates of the first and second plate groups at the outlet, either the first plate group or the second plate group has plates thereof thickened in the direction orthogonal to the longitudinal direction at the outlet, and gaps between the plates thickened at the outlet are narrower than gaps of the plates at the inlet, and wherein the sludge is conveyed from the inlet to the outlet as the upper surfaces of the plates of the first and second plate groups are alternately moved up and down in response to a parallel movement of the first plate group and/or the second plate group.

2. The solid-liquid separating system defined in claim 1, wherein the plates of either the first or second plate group whose thickness is increased at the outlet are divided into first split plates positioned at the inlet, and second split plates positioned at the outlet and being thicker than the first split plates.

3. The solid-liquid separating system defined in claim 2, wherein sizes of the gaps between the plates at the outlet are adjustable by changing the thickness of the second split plates.

4. The solid-liquid separating system defined in claim 3, wherein a partition is provided near a border between the first and second split plates, and sludge treated by the first split plates and sludge treated by the second split plates are separately recovered.

5. The solid-liquid separating system defined in claim 1, wherein the first and second plate groups perform the parallel movement with a phase difference.

6. The solid-liquid separating system defined in claim 5, wherein upper edges of the plates of either the first or second plate group performing the parallel movement are corrugated.

7. The solid-liquid separating system defined in claim 1, wherein corrugated upper edges of the plates are sloped toward the outlet.

8. The solid-liquid separating system defined in claim 1, wherein the filter is sloped up toward the outlet.

* * * * *